(12) United States Patent
Quist

(10) Patent No.: US 12,101,579 B1
(45) Date of Patent: Sep. 24, 2024

(54) LIVE PROJECTED DISPLAY PANEL SYSTEM

(71) Applicant: Julian P. Quist, Hillsboro, OR (US)

(72) Inventor: Julian P. Quist, Hillsboro, OR (US)

( * ) Notice: Subject to any disclaimer, the term of this patent is extended or adjusted under 35 U.S.C. 154(b) by 0 days.

(21) Appl. No.: 17/503,542

(22) Filed: Oct. 18, 2021

Related U.S. Application Data

(60) Provisional application No. 63/092,578, filed on Oct. 16, 2020.

(51) Int. Cl.
| | |
|---|---|
| *H04N 7/18* | (2006.01) |
| *E06B 7/02* | (2006.01) |
| *E06B 7/28* | (2006.01) |
| *H04N 5/64* | (2006.01) |

(52) U.S. Cl.
CPC ............... *H04N 7/181* (2013.01); *E06B 7/02* (2013.01); *E06B 7/28* (2013.01); *H04N 5/64* (2013.01)

(58) Field of Classification Search
CPC .......... H04N 7/181; H04N 5/64; H04N 23/51; H04N 23/57; E06B 7/02; E06B 7/28; G08B 13/19617; G08B 13/19619; G08B 13/1963; G08B 13/19632; G08B 15/001
USPC ...................................................... 348/151
See application file for complete search history.

(56) References Cited

U.S. PATENT DOCUMENTS

| | | | | |
|---|---|---|---|---|
| 3,879,742 | A * | 4/1975 | Smith | G03B 17/08 396/25 |
| 5,875,997 | A * | 3/1999 | Al-Sabah | B64C 1/00 244/118.5 |
| 7,777,718 | B2 * | 8/2010 | Franko | B64D 11/00155 345/156 |
| 8,259,178 | B2 | 9/2012 | Basso et al. | |
| 9,342,467 | B1 | 5/2016 | McGrath et al. | |
| 9,456,184 | B2 | 9/2016 | Barrou et al. | |
| 9,787,948 | B2 * | 10/2017 | De Carvalho | H04N 7/183 |
| 9,787,958 | B2 | 10/2017 | Hattingh et al. | |
| 9,864,559 | B2 | 1/2018 | Sizelove | |
| 10,311,768 | B2 | 6/2019 | Lapstun | |
| 10,419,667 | B2 | 9/2019 | Riedel | |
| 10,579,861 | B2 | 3/2020 | Kohlmeier-Beckmann | |
| 10,701,304 | B2 | 6/2020 | Devendran et al. | |
| 2008/0179457 | A1 * | 7/2008 | Guering | B64C 1/0683 244/118.5 |
| 2010/0157063 | A1 * | 6/2010 | Basso | G09F 27/00 348/169 |
| 2011/0069158 | A1 * | 3/2011 | Shiloh | H04N 7/181 348/61 |
| 2014/0065329 | A1 * | 3/2014 | Showers | E06B 3/6612 428/34 |
| 2017/0057660 | A1 * | 3/2017 | Badger | H04N 23/57 |

* cited by examiner

*Primary Examiner* — Thai Q Tran
*Assistant Examiner* — Nienru Yang
(74) *Attorney, Agent, or Firm* — Cramer Patent & Design PLLC; Aaron R. Cramer

(57) ABSTRACT

A live projected display panel has a traditionally configured window frame having an LED display on a first side and a camera on a second side. The device is configured to be installed where a window would normally be placed and project the outside view upon the interior LED display. Each display is in communication with a power source.

1 Claim, 5 Drawing Sheets

LIVE PROJECTED DISPLAY PANEL SYSTEM

RELATED APPLICATIONS

The present invention was first described in and claims the benefit of U.S. Provisional Application No. 63/092,578 filed Oct. 16, 2020, the entire disclosures of which are incorporated herein by reference.

FIELD OF THE INVENTION

The present invention relates to a display system that generates a live image and projects it onto a surface.

BACKGROUND OF THE INVENTION

Just about everyone will agree that a window with a view is a highly desired item. Whether the window is on a house or on an office building, the feeling of openness, spaciousness, and just the general good feeling of being connected to the world around you, puts one in a better mood. Unfortunately, due to security reasons, architectural limitations, or simply budget restrictions during construction, windows are often left out.

Additionally, large buildings with rooms or offices on the interior do not have the luxury of a window view. Such rooms are viewed as dark, dreary, and less desirable than a window room or office. Thermal losses through a window are much greater than an insulated wall resulting in higher heating and cooling costs when compared to a room with no windows. Accordingly, there exists a need for a means by which a window view can be provided almost anywhere in a manner that addresses the above concerns. The development of the live projected display panel system fulfills this need.

SUMMARY OF THE INVENTION

To achieve the above and other objectives, the present invention provides for a live projected display panel system that has, a flat panel display adapted to be disposed on a wall that produces a visual effect of a transparent window of a structure, a window sill attached on a bottom of the flat panel display to further simulate the transparent window of the structure, one or more other accessories to further simulate the transparent window, a plurality of exterior cameras located on an exterior face of an exterior wall, and a control unit disposed within the structure to accept a plurality of signals from any of the exterior cameras as well as to provide a plurality of additional signals to the flat panel display.

The flat panel display may provide a plurality of video images that are generated from the exterior cameras. The structure may be selected from the group consisting of a single-family residence, an office, a factory, a shop, an apartment, a multi-story building, or a mobile home. The structure may include a plurality of the flat panel displays. The flat panel display may be installed over an installed transparent window. The installed transparent window may be replaced with a piece of insulation. The insulation may have a rating of R-6. The live projected display panel system may further comprise an air gap that may be disposed between the piece of insulation and an exterior glass. The exterior glass may be mirrored. The exterior glass may be frosted. One of the exterior cameras may be mounted within the air gap. Mounting within the air gap may provide increased physical protection of the exterior cameras, while ensuring that the exterior cameras are not visible from the exterior of the structure.

The windowsill may include a plurality of vent openings to allow for air flow through a void space behind the flat panel display to allow for air cooling. The windowsill may be removed on the bottom of the flat panel display. The one or more other accessories may be selected from the group consisting of one or more curtains, one or more valences, and one or more wall decorations. The exterior faces may be weatherproof and discrete in appearance. A power and control cabling may be routed within the void space where it connects to the control unit. The power and control cabling may be routed within the exterior wall where it may connect to the control unit. The control unit may be a central processor for all of the video signals produced by the exterior cameras. The video signals may be wired or wireless.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
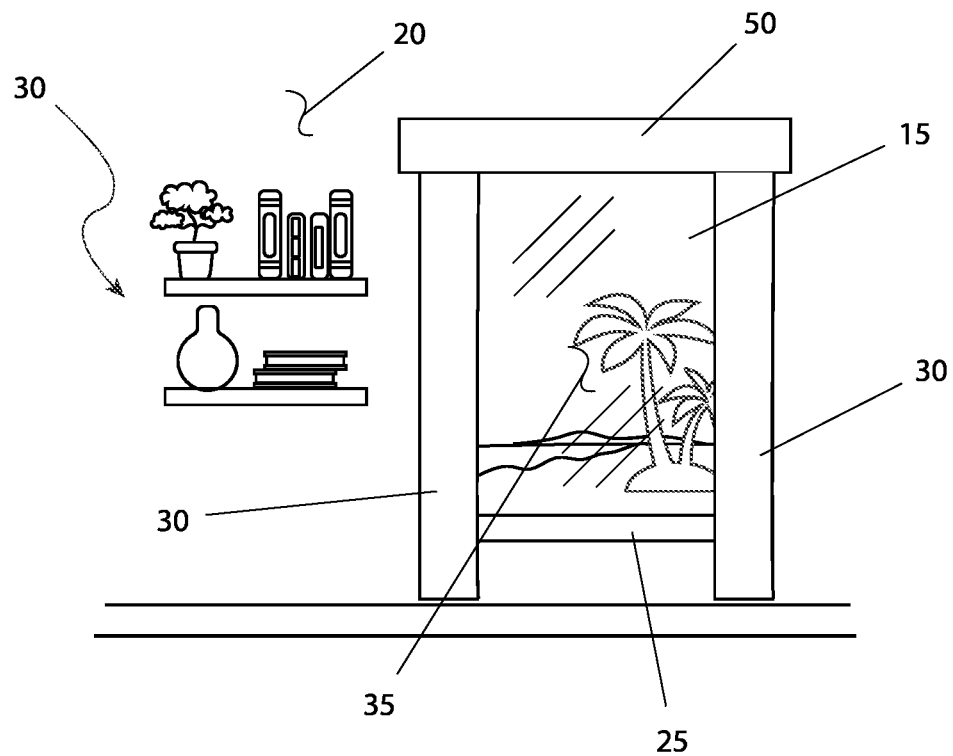
FIG. 1 is a front view of the live projected display panel system, according to the preferred embodiment of the present invention.

DESCRIPTIVE KEY 10 live projected display panel system
15 flat panel display
20 wall
25 window sill
30 accessories
35 video image
40 structure
45 conventional window
50 interior wall
55 exterior camera
60 exterior face
65 exterior wall
70 control unit
75 interior side
80 glass
81 interstitial space
85 vent opening
90 air flow
95 void space
100 insulation 105 air gap
110 exterior glass
115 power and control cabling
120 signal path
125 external video feed
130 local video file source

DESCRIPTION OF THE INVENTION

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a front view of the live projected display panel system 10, according to the preferred embodiment of the present invention is disclosed. The live projected display panel system (herein also described as the "system") 10, provides for a virtual window within a window-less living space. The invention utilizes a flat panel display 15 that is located on a wall 20 that produces the visual effect of a typical window. A window sill 25 may be added on the bottom of the flat panel display 15 to increase realism. Other accessories 30 such as curtains, valences, wall decorations, and the like, may be added to further increase realism. The flat panel display 15 provides video images 35 that is generated from multiple sources and will be further described herein below. It is noted that the flat panel display 15 may be of any size and orientated in either or portrait (as shown) or landscape mode.

Figure 2:
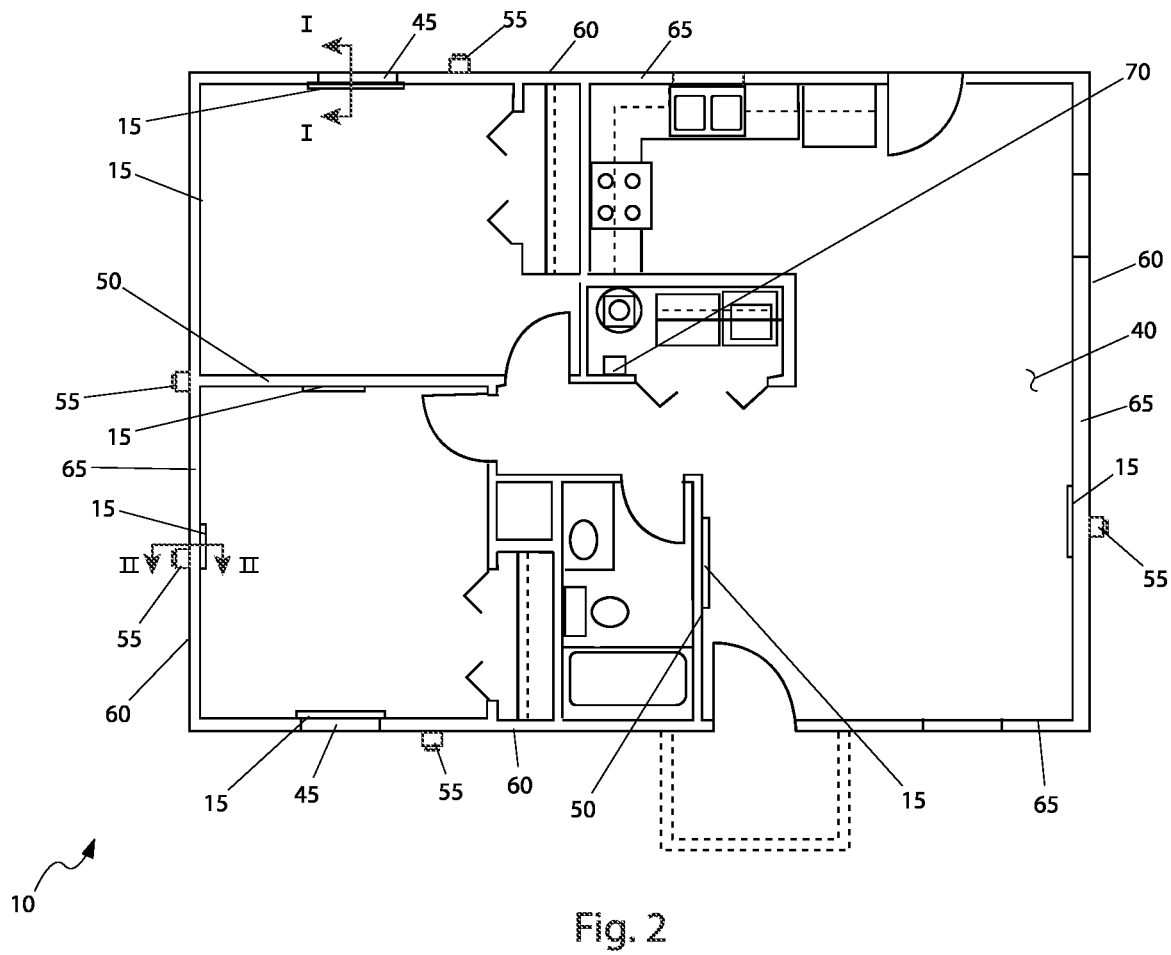
FIG. 2 is a plan view of multiple live projected display panel system, shown in in an installed state on a structure, according to the preferred embodiment of the present invention.

Referring next to FIG. 2, a plan view of system 10, shown in in an installed state on a structure 40, according to the preferred embodiment of the present invention is depicted. The structure 40 is depicted as a single-family residence. However, other structure 40 such as offices, factories, shops, apartments, multi-story buildings, mobile homes and the like will also benefit from the teachings of the present invention. As such, the use of the system 10 in any particular style of structure 40 is not intended to be a limiting factor of the present invention. In the illustrated embodiment, there is a shown a structure 40 having multiple flat panel displays 40 installed therein. Various flat panel displays 15 are located throughout in the structure 40 in locations where conventional windows would be expected to be found. Such locations may be in front of conventional windows 45 or located on a wall 20 without a conventional window 45. It is noted that the flat panel display 15 may also be placed on an interior wall 50. A set of exterior cameras 55 are located on the exterior face 60 of exterior walls 65. The exterior faces 60 are envisioned to be weatherproof, small, and discrete in appearance. A control unit 70 is located within the structure 40 to accept all signals from any exterior camera 55 as well as to provide signals to the flat panel display 15. Further description of the control unit 70 will be provided herein below.

Figure 3:
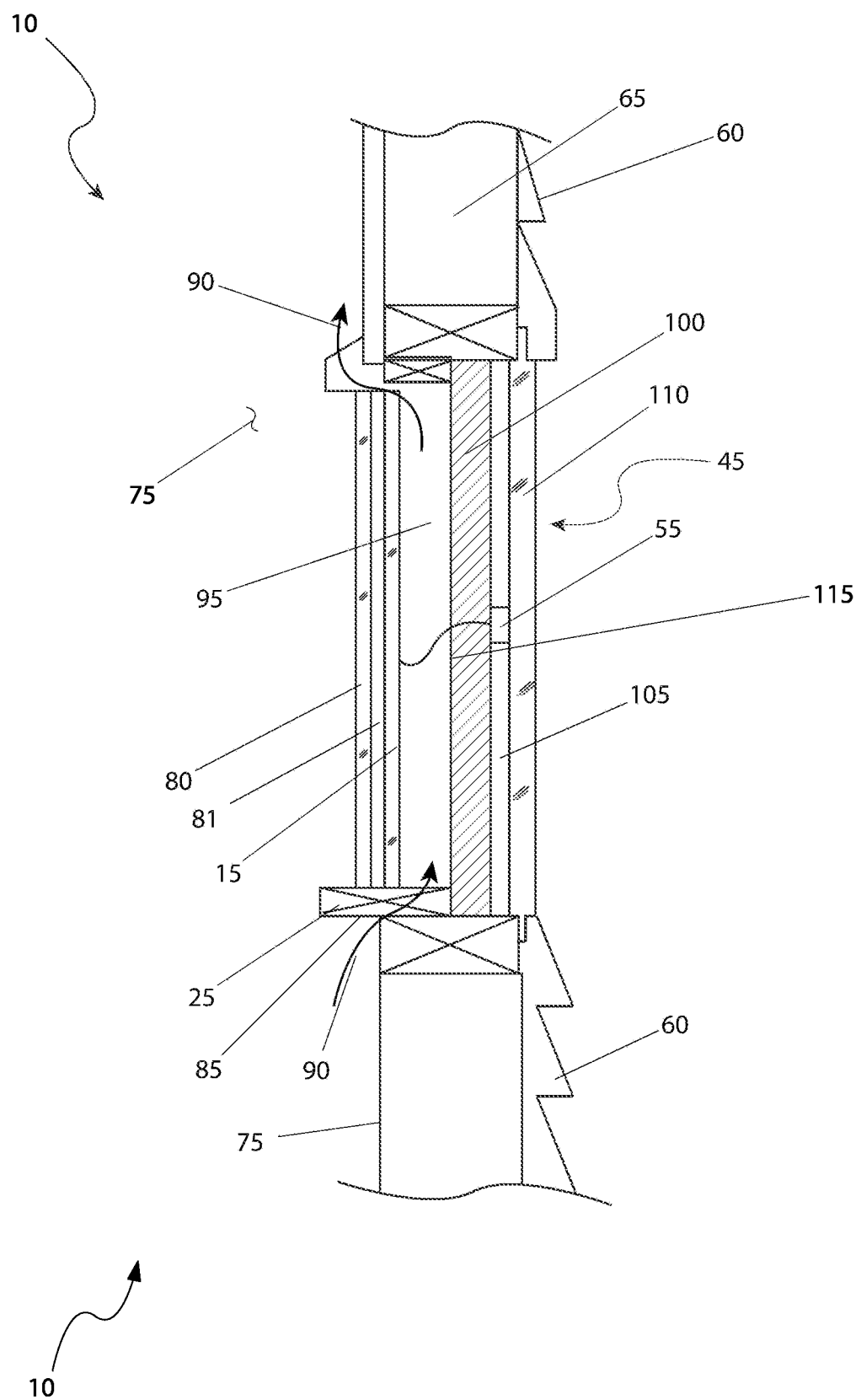
FIG. 3 is a sectional view of the live projected display panel system, as seen along a Line I-I, as shown in FIG. 1, according to the preferred embodiment of the present invention.

Referring now to FIG. 3, a sectional view of the system 10, as seen along a Line I-I, as shown in FIG. 1, according to the preferred embodiment of the present invention is shown. This view is typical for an individual installation over an existing conventional window 45. The flat panel display 15 is installed on the interior side 75 of an exterior wall 65 and is located behind a piece of protective glass 80 to protect the flat panel display 15 against physical impact, separate by interstitial space 81. Vent openings 85 in the window sill 25 allow for air flow 90 through a void space 95 behind the flat panel display 15 to allow for air cooling. The conventional window 45 is replaced with a section of insulation 100, with a rating of approximately R-6. An air gap 105 is then provided between the insulation 100 and an exterior glass 110, envisioned to be mirrored or frosted. Any exterior camera 55 may be provided within the air gap 105 rather than direct mounting on the exterior face 60 (as shown in FIG. 2). Mounting within the air gap 105 provides for increased physical protection of the exterior cameras 55, while ensuring that the exterior cameras 55 is not visible from the exterior of the structure 40 (as shown in FIG. 2). Power and control cabling 115 is routed within the void space 95 where it connects to the control unit 70 (as shown in FIG. 2).

Figure 4:
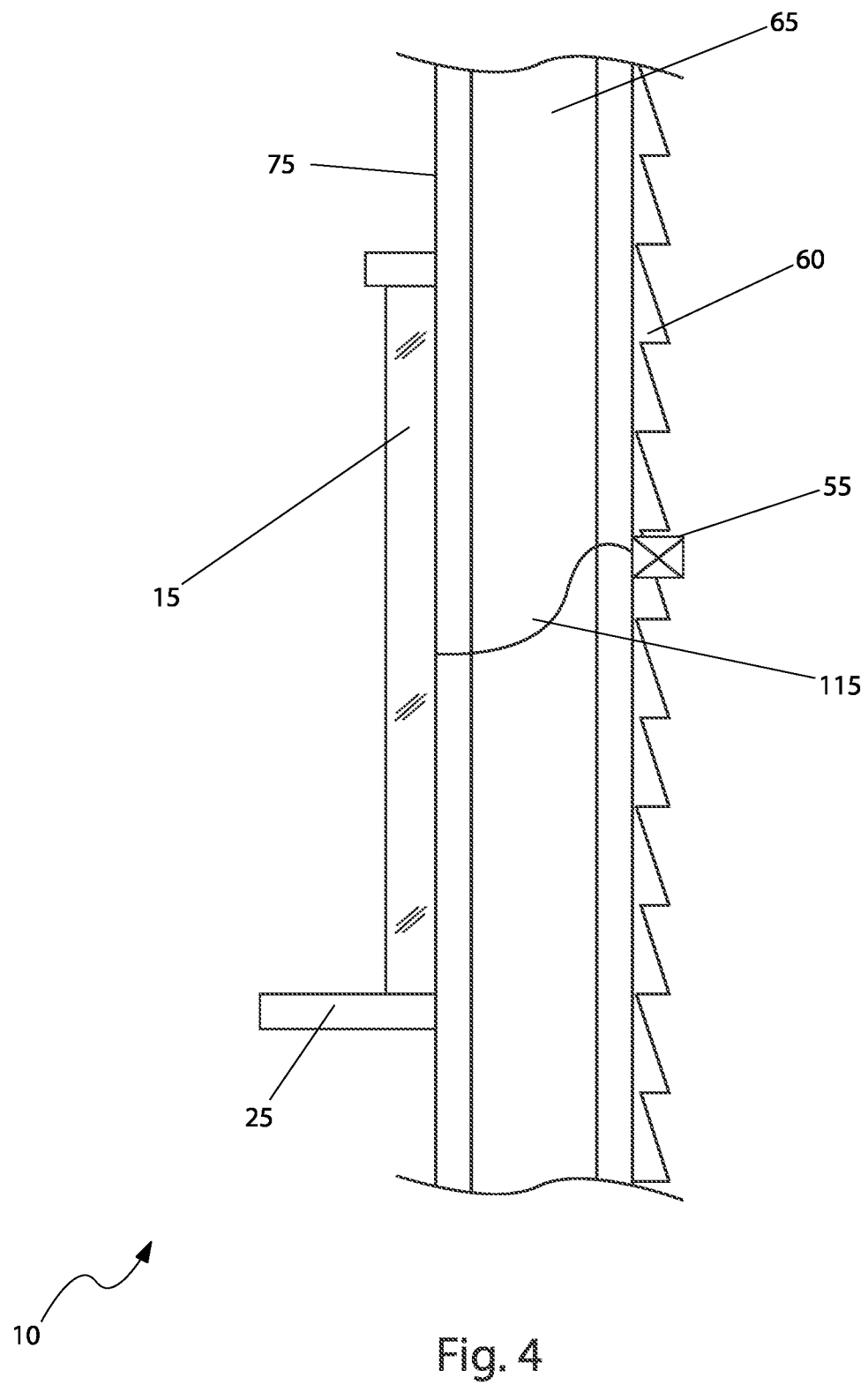
FIG. 4 is a sectional view of the live projected display panel system, as seen along a Line I-I, as shown in FIG. 1, according to an alternate embodiment of the present invention.

Referring next to FIG. 4, a sectional view of the system 10, as seen along a Line I-I, as shown in FIG. 1, according to an alternate embodiment of the present invention is disclosed. This alternate embodiment would be utilized in locations where a conventional window 45 (as shown in FIGS. 2 and 3) is not available and/or desired. The flat panel display 15 is mounted directly on the interior side 75 of the exterior wall 65. A window sill 25 may or may not be provided. An exterior camera 55 may be mounted directly opposite the flat panel display 15 (as shown) on the exterior face 60 of the same exterior wall 65 or may be mounted remotely. Power and control cabling 115 are routed within the exterior wall 65 where it connects to the control unit 70 (as shown in FIG. 2).

Figure 5:
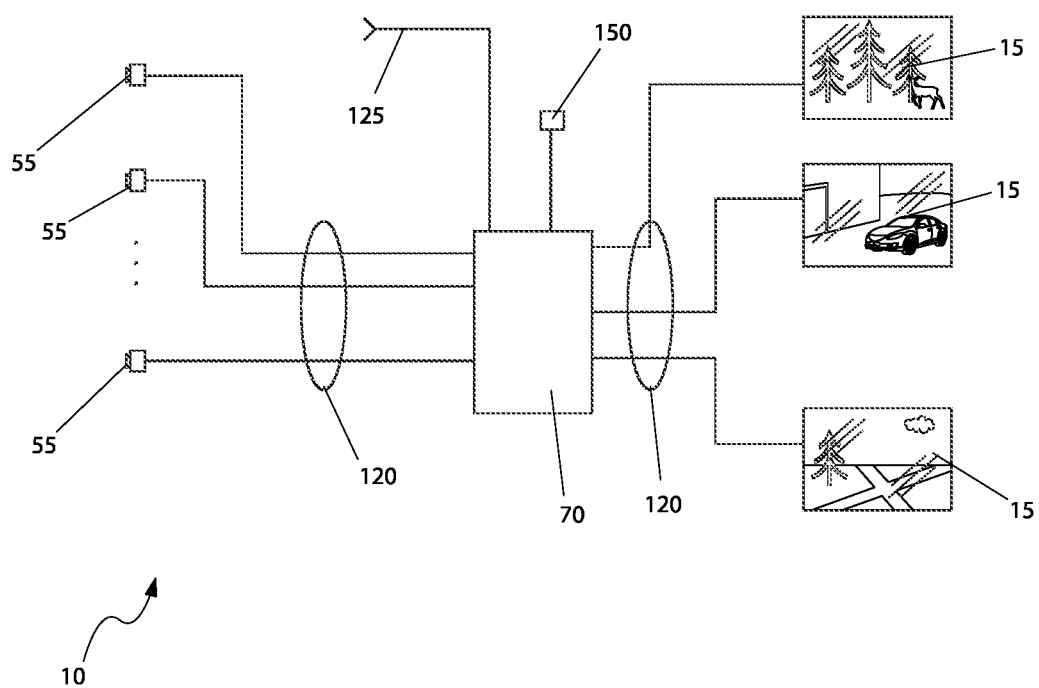
FIG. 5 is an electrical block diagram of the live projected display panel system, according to the preferred embodiment of the present invention.

Referring to FIG. 5, an electrical block diagram of the system 10, according to the preferred embodiment of the present invention is depicted. The control unit 70 serves as a central processor for all video signals produced by the exterior cameras 55. The exterior cameras 55 serve as inputs to the control unit 70 via signal path 120. The signal path 120 may be either wired or wireless. The flat panel display 15 are provided outputs from the control unit 70 via signal path 120 in a similar manner. While in normal use, the flat panel display 15 will present video images 35 (as shown in FIG. 1) in a live and continuous manner, the control unit 70 provides additional functionality as follows. First, it is capable of recording all feeds from the exterior cameras 55 thus allow service as a video surveillance system. Second, the control unit 70 may provide pre-recorded video images 35 from the exterior cameras 55 to the flat panel display 15, such as to simulate nighttime or daytime hours for those who may work late shifts and wish to maintain logical sleeping conditions. Third, an external video feed 125, such as from a cable television system or internet connection, may provide standard video images 35 from broadcast news sources, internet video sites, or the like, allowing the flat panel display 15 to function as a standard television receiver. Fourth, the external video feed 125 may provide static video image feeds from remote locations, thus allowing the flat panel display 15 to depict video images 35 from far away location such as beaches, forests, mountain tops, or the like regardless of the real physical location. Fifth, a local video file source 130, such as a computer, USB drive, mobile telephone, tablet computer, or the like may display photographs or video images on a repeating or static basis. Finally, the control unit 70 serves as a switcher, allowing any and all video sources to be served to any flat panel display 15. For example, a flat panel display 15, normally positioned on an east wall of a structure 40 (as shown in FIG. 2), can be provided with an image from an exterior camera 55 on a south exterior wall, thus allowing for more desired or interesting views to be viewed on a flat panel display 15 whose corresponding real window view is far less interesting or enjoyable. The images displayed can be live video streams or stills generated from a captured image.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 5. The user would procure the system 10 from conventional procurement channels such as electronic stores, discount stores, department stores, hardware stores, home improvement stores, mail order and internet supply houses and the like. Special attention would be paid to the overall size of the flat panel display 15, number of flat panel displays 15 and exterior cameras 55 needed, capabilities of the control unit 70 and so forth.

After procurement and prior to utilization, the system 10 would be prepared in the following manner: in the case where the flat panel display 15 is to take the place of a conventional windows 45, the conventional windows 45 would be removed and the flat panel display 15 installed in its place, as depicted in FIG. 2, in the case of the flat panel display 15 being installed on a normally blank interior wall 50 or exterior wall 65 as depicted in FIG. 3; all power and control cabling 115 is then routed to the control unit 70. At this point in time, the system 10 is ready for utilization.

During utilization of the system 10, the following procedure would be initiated: the user would decide which still or video image 35 is to be displayed on which flat panel display 15, such as a live or previously recorded image from an exterior camera 55 on the opposite side of the wall, an exterior camera 55 on a opposite face of the structure 40, video images 35 from a remote source via the external video feed 125, or from a local source via the local video file source 130. The video is then casually watched as one would be cognizant of activities outside of a conventional window 45. Such a selection and viewing process is repeated until it is no longer desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A live projected display panel system providing a virtual window within a window-less living space, comprising:
    a flat panel display located on a wall to produce a visual effect of a typical window, wherein the flat panel display may be of any size and oriented in portrait or landscape mode;
    a window sill disposed on a bottom of the flat panel display;
    additional accessories, such as curtains, valences, and wall decorations, to further enhance realism;
    a control unit located within a structure to accept signals from an exterior cameras and provide signals to the flat panel display;
    an air gap provided between an insulation and exterior glass, which may be mirrored or frosted;
    at least one exterior camera mounted within the air gap for increased protection and concealment, or directly on the exterior face of the wall opposite the flat panel display;
    a power and control cabling routed within a void space behind the flat panel display or within an exterior wall connecting to the control unit; and,
    wherein a video images is displayed on the flat panel display generated from multiple sources, including exterior cameras mounted on the exterior face of exterior walls, with the cameras being weatherproof, small, and discrete;
    wherein the flat panel display is installed behind a piece of protective glass and separated by an interstitial space with vent openings for air flow cooling, and replacing a conventional window with insulation having a rating of approximately R-6 and an air gap;
    wherein the control unit providing additional functionalities, such as recording video feeds from the exterior cameras for surveillance, providing pre-recorded video images to simulate different times of day, allowing external video feeds from cable television or internet connections, displaying static video images from remote locations, and showing photographs or videos from local video file sources; and,
    wherein the control unit serving as a switcher to allow any video source to be displayed on any flat panel display, enabling the display of images from an exterior camera on a different exterior wall or from other sources to provide more desirable views.

* * * * *